(12) United States Patent
Dudley et al.

(10) Patent No.: US 8,950,439 B2
(45) Date of Patent: Feb. 10, 2015

(54) INSULATED DUCTWORK PRODUCTS

(75) Inventors: Peter Dudley, Essex (GB); Peter Merrien, Essex (GB); Kevin Sewell, East Sussex (GB)

(73) Assignee: Spiralite Holdings Limited (GB)

( * ) Notice: Subject to any disclaimer, the term of this patent is extended or adjusted under 35 U.S.C. 154(b) by 878 days.

(21) Appl. No.: 12/443,363

(22) PCT Filed: Sep. 28, 2007

(86) PCT No.: PCT/GB2007/003692
§ 371 (c)(1),
(2), (4) Date: May 13, 2009

(87) PCT Pub. No.: WO2008/038013
PCT Pub. Date: Apr. 3, 2008

(65) Prior Publication Data
US 2010/0089483 A1    Apr. 15, 2010

(30) Foreign Application Priority Data

Sep. 29, 2006  (GB) .................................. 0619178.7
Jun. 11, 2007  (GB) .................................. 0711224.6

(51) Int. Cl.
F16L 9/14        (2006.01)
F16L 59/02       (2006.01)
B32B 3/30        (2006.01)

(52) U.S. Cl.
CPC    *F16L 59/026* (2013.01); *B32B 3/30* (2013.01)
USPC ............ 138/149; 138/120; 138/155; 138/158

(58) Field of Classification Search
CPC ...... F16L 59/021; F16L 59/023; F16L 59/029
USPC .................................. 138/149, 120, 155, 158
See application file for complete search history.

(56) References Cited

U.S. PATENT DOCUMENTS 2,776,231 A    6/1954   Brown
3,117,902 A    1/1964   Holzheimer
(Continued)

FOREIGN PATENT DOCUMENTS

AU    782876    9/2005    ............. F16L 21/00
CH    228042    7/1943    ............. F16L 59/02
(Continued)

OTHER PUBLICATIONS

Venture Tape Product Sheet (Venture Guard 1574CW-H)—Mar. 2006.
(Continued)

*Primary Examiner* — James Hook
(74) *Attorney, Agent, or Firm* — DLA Piper LLP (US)

(57) ABSTRACT

An intermediate insulating product (20) is disclosed comprising a planar insulating layer (11) having a top side in to which is formed a plurality of parallel channels (14) having cross-sections with tapered sides. A vapor proof layer (18) is applied to the top surface after the channels (14) have been formed such that the vapor proof layer (18) bridges the plurality of parallel channels (14). The intermediate insulating product (20) is then bent with mechanical manipulation in regions adjacent the bottom of the channels (14) thereby causing the channels (14) to close to form a non-planar, derivative insulated ductwork product (30) and the vapor proof layer (18) forms a vapor proof inner lining to the derivative insulated ductwork product (30).

33 Claims, 17 Drawing Sheets

(56) References Cited

U.S. PATENT DOCUMENTS

| | | | | |
|---|---|---|---|---|
| 3,251,382 A * | 5/1966 | Tatsch | | 138/151 |
| 3,336,951 A | 8/1967 | Huelster | | |
| 3,463,691 A * | 8/1969 | Martin | | 156/294 |
| 3,557,840 A | 1/1971 | Maybee | | 138/149 |
| 3,649,398 A * | 3/1972 | Keith | | 156/79 |
| 3,687,170 A * | 8/1972 | Malone et al. | | 138/143 |
| 3,955,834 A | 5/1976 | Ahlrot | | 285/110 |
| 4,576,206 A * | 3/1986 | Lauren | | 138/149 |
| 4,842,908 A * | 6/1989 | Cohen et al. | | 428/34.2 |
| 5,219,403 A * | 6/1993 | Murphy | | 137/561 A |
| 5,310,594 A * | 5/1994 | Holland et al. | | 428/167 |
| 5,421,938 A | 6/1995 | Cunningham, Jr. | | 156/217 |
| 5,567,504 A * | 10/1996 | Schakel et al. | | 428/167 |
| 5,918,644 A * | 7/1999 | Haack et al. | | 138/151 |
| 6,000,437 A | 12/1999 | Ponder et al. | | 138/149 |
| 6,110,310 A | 8/2000 | Eyhorn et al. | | 156/188 |
| 6,148,867 A | 11/2000 | Matthews et al. | | 138/149 |
| 6,196,272 B1 * | 3/2001 | Davis et al. | | 138/149 |
| 6,231,927 B1 | 5/2001 | Ruid | | 427/358 |
| 6,322,111 B1 | 11/2001 | Brady | | |
| 6,578,876 B2 | 6/2003 | Guertin, Jr. | | |
| 6,676,173 B2 | 1/2004 | Donnelly | | |
| 7,523,964 B2 | 4/2009 | Sandman et al. | | |
| 8,074,687 B2 | 12/2011 | Queau et al. | | |
| 2002/0070547 A1 | 6/2002 | Guertin, Jr. | | 285/148.19 |
| 2003/0098586 A1 | 5/2003 | Donnelly | | 285/373 |
| 2004/0118472 A1 * | 6/2004 | Mota et al. | | 138/149 |
| 2005/0218655 A1 * | 10/2005 | Ruid et al. | | 285/915 |
| 2006/0214423 A1 | 9/2006 | Sandman et al. | | 285/370 |
| 2009/0145506 A1 * | 6/2009 | Queau et al. | | 138/112 |

FOREIGN PATENT DOCUMENTS

| | | | | |
|---|---|---|---|---|
| DE | 3121602 A1 | 12/1982 | | F16L 21/00 |
| DE | 3232277 | 3/1984 | | F16L 59/14 |
| DE | 35 40712 | 11/1985 | | |
| DE | 9015484.3 | 1/1991 | | F16B 7/02 |
| FR | 2262769 | 9/1975 | | F16L 59/14 |
| FR | 2409855 A1 | 6/1979 | | B32B 5/18 |
| GB | 113121 | 1/1918 | | |
| GB | 949329 | 2/1964 | | F16L 59/02 |
| GB | 1137121 | 12/1968 | | F16L 59/02 |
| GB | 1 414 113 | 1/1974 | | |
| GB | 2042118 | 9/1980 | | F16L 21/00 |
| GB | 2242646 | 10/1991 | | B32B 3/16 |
| GB | 2443734 | 5/2008 | | F16L 59/02 |
| JP | 62-117458 | 7/1948 | | |
| JP | 41-17514 | 10/1966 | | |
| JP | 61-143484 | 7/1986 | | |
| JP | 61-252990 | 11/1986 | | |
| JP | 62-117458 | 7/1987 | | |
| JP | 1-78848 | 5/1989 | | |
| JP | 4-48429 | 11/1992 | | |
| JP | 7-38895 | 7/1995 | | |
| JP | 07-293763 | 11/1995 | | |
| JP | 08-326991 | 12/1996 | | |
| JP | 11-270781 | 10/1999 | | |
| JP | 11-280989 | 10/1999 | | |
| JP | 3-187384 | 7/2001 | | |
| JP | 2002-327953 | 11/2002 | | |
| JP | 2003-222289 | 8/2003 | | |
| JP | 2004-225917 | 8/2004 | | |
| JP | 2006-029681 | 2/2006 | | |
| JP | 4675069 | 4/2011 | | |
| NL | 7502320 | 9/1975 | | E04F 17/04 |
| WO | 85/04922 | 11/1985 | | E04C 2/40 |
| WO | 96/32605 | 10/1996 | | F16L 59/06 |
| WO | 2005/059423 | 6/2005 | | F16L 21/00 |
| ZA | 751216 | 2/1975 | | |

OTHER PUBLICATIONS

Venture Tape Product Sheet (VentureClad 1579CW)—Mar. 2006.
Kool Duct System (Pre-insulated Ducting—Price List—Sep. 2000) [Pricing information redacted].
Japanese Decision of Refusal for Corresponding Japanese Patent Application No. P2009-529764 dated Feb. 12, 2013 and English Translation.
Canadian Exam Report dated Nov. 29, 2013 for corresponding Canadian Application No. 2,664,046.
Corresponding Japanese Office Action dated Jul. 5, 2014.
English translation of Office Action dated May 7, 2014 from corresponding Japanese Application No. 2013-124082.

* cited by examiner

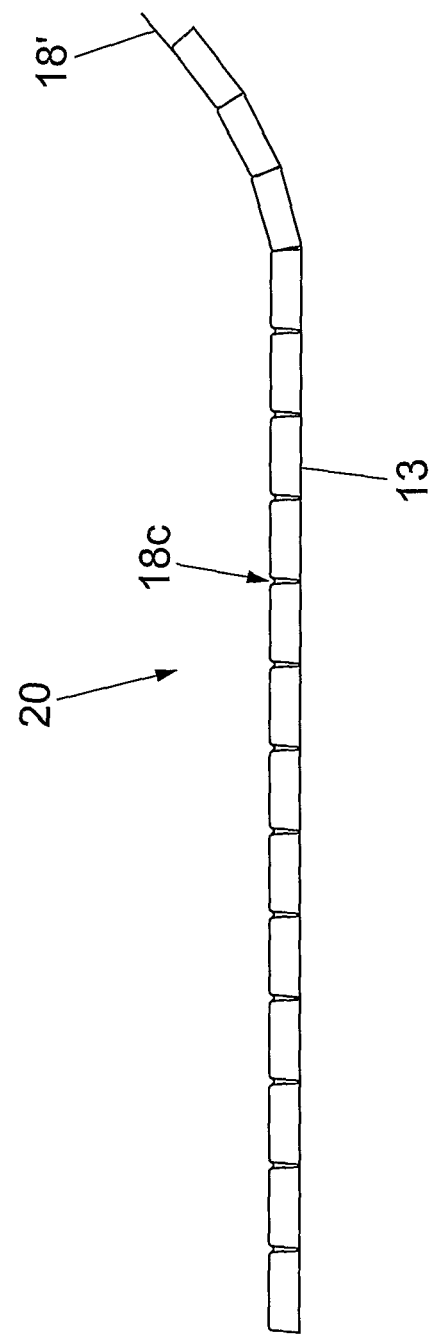

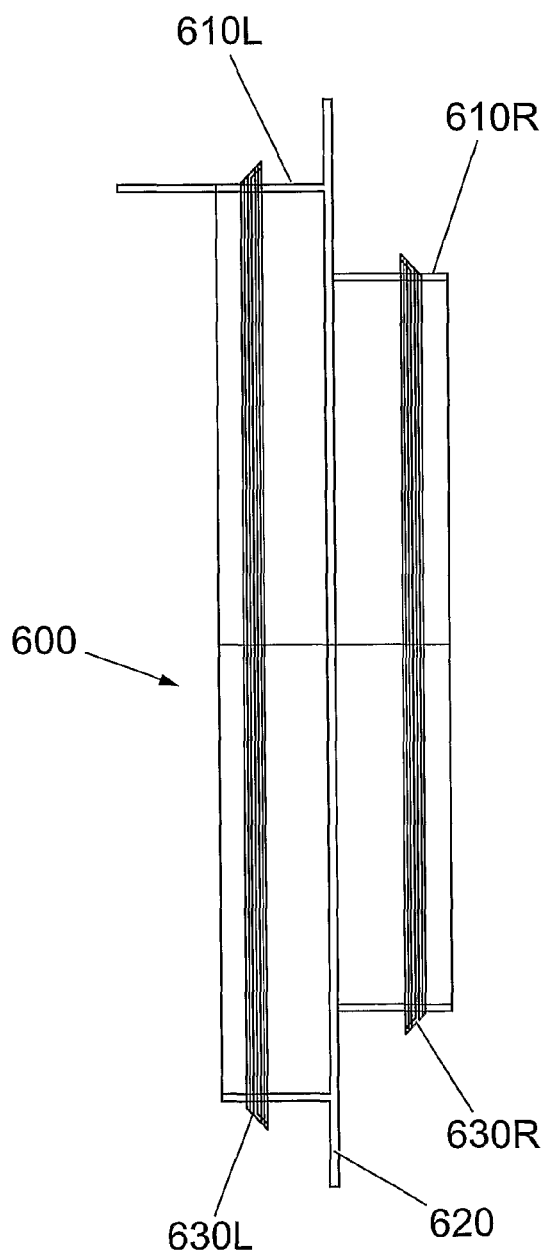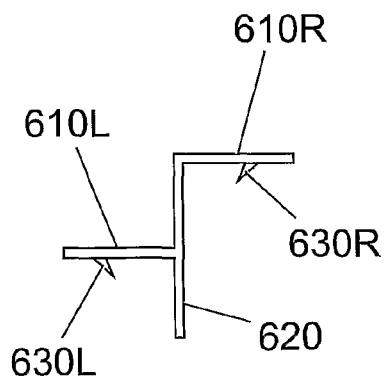
*Fig. 6A*        *Fig. 6B*

INSULATED DUCTWORK PRODUCTS

FIELD OF THE INVENTION

This application is a US National Phase Application of PCT International Application No. PCT/GB2007/003692 filed Sep. 28, 2007, which claims priority of United Kingdom Application. Nos. 0619178.7 filed Sep. 29, 2006 and 0711224.6 filed Jun. 11, 2007. The present invention relates to insulated ductwork products and, in particular, to an intermediate insulating product from which can be formed a derivative insulated ductwork product.

BACKGROUND OF THE INVENTION

Pre-formed insulated ductwork products for carrying gasses in, for example, air conditioning systems and are used throughout the building and construction industry particularly due to their relatively fast speed of erection and relatively low cost compared to metal or plastic pipe work that must be subsequently lagged. An example of such pre-formed insulated ductwork is shown in UK Patent Publication number GB1,137,121 to Lo-Dense Fixings (Rugby) Limited which discloses providing longitudinal channels in a plastics foam material with a backing material which can be folded into a square or a circular cross sectioned insulated ducting. Other examples are shown in U.S. Pat. No. 6,148,867 which also discloses providing longitudinal channels in a fibrous and/or cellular foam insulation material with a moisture facing outer material which can be folded into a circular cross sectioned insulated ducting. Other broadly similar systems are disclosed in International Patent Publication number WO8504922 and Dutch Patent Publication number NL7502320.

However, such conventional systems suffer from the disadvantage that they cannot be used for ducting liquid as the liquid can ruin the insulating material. Furthermore, the open nature of the insulation material to the airflow passing through the ducting can mean that bugs/diseases etc. are more likely to be able to survive and colonise in the shelter of the insulation joints, thus causing an increased health risk. Moreover, the open nature of the insulation material can also mean that dust from the insulation material could become airborne into the air passing along the throughbore, again causing an increased health risk.

BRIEF SUMMARY OF THE INVENTION

In accordance with a first aspect of the present invention, there is provided an intermediate insulating product comprising a planar insulating layer having a resulting innermost surface in to which is formed a plurality of parallel channels; wherein the channels comprise cross-sections with tapered sides; further comprising a vapour proof layer applied to the resulting innermost surface such that the vapour proof layer bridges the plurality of parallel channels; and wherein, with subsequent mechanical manipulation, the intermediate insulating product can be bent in regions adjacent the bottom of the channels, thereby causing the channels to substantially close to form a non-planar, derivative insulated ductwork product having an inner throughbore and the vapour proof layer forms a vapour proof inner lining to the derivative insulated product; characterised by the vapour proof layer comprising a sealing means to substantially seal the inner throughbore with respect to the outside of the derivative insulated ductwork product.

The present invention provides a planar intermediate insulating product which can be formed into a non-planar, derivative insulated ductwork product. The derivative insulated ductwork product is typically of sufficient strength such that it can be installed to provide a fluid conduit such as an air conditioning conduit of itself and thereby obviates the time consuming and expensive conventional requirement for metal ductwork to be applied with insulation such as that shown in U.S. Pat. No. 6,000,437.

Importantly, the taper enables up to the substantial entirety of the sides of the channels (as existing in the intermediate insulating product) to contact each other when formed into the derivative insulated product, thereby ensuring integrity of the insulation in the derivative insulation product.

Typically, a continuous protective layer is provided on the bottom side of the insulating layer.

Typically, a protective layer is provided on the top side of the planar insulating layer prior to forming the channels, said protective layer adapted to reduce flaking or chipping of the planar insulating layer.

The channels are preferably formed by routing and optionally, the channels may be at least partially filled with a sealant and/or an adhesive.

The cumulative internal angles of the channels are typically arranged such that it is possible to bend the intermediate insulating product so as to form the derivative insulated ductwork product with a complete polygon cross-section.

Preferably, the sealing means comprises a flap member provided at one end of the vapour proof layer and which is arranged to overlap the other end of the vapour proof layer when the intermediate insulating product has been bent to form the non-planar, derivative insulated product such that the vapour proof layer extends greater than 360 degrees around the inner throughbore. Moreover, the vapour proof layer is preferably substantially the same width as the resulting innermost surface of the planar insulating layer to which it is applied, and has a longer length than the resulting innermost surface of the planar insulating layer such that the flap member projects past one end of the planar insulating layer. Typically, the flap member is integral with and forms an extension of the rest of the vapour proof layer.

The vapour proof layer preferably comprises a laminated vapour proof barrier and more preferably comprises a laminated foil vapour proof barrier formed from a number of layered sheets.

Typically, the vapour proof layer comprises a securing means formed on it's resulting outermost surface and which is adapted to secure the vapour proof layer to the said resulting innermost surface of the planar insulating layer. Preferably, the securing means comprises a self adhesive formed on the resulting innermost surface of the vapour proof layer and more preferably the self adhesive comprises a pressure sensitive adhesive pre-applied to the resulting outermost surface of the vapour proof layer.

Preferably, a further vapour proof layer is applied to the bottom surface of the planar insulating layer such that the said further vapour proof layer forms an outer vapour proof protective barrier to the derivative insulated product. Preferably, a further securing means is provided between the further vapour proof layer and the said bottom surface, and the said further securing means preferably comprises an adhesive means initially provided on the inner most surface of the further vapour proof layer.

The planar insulating layer comprises a substantially rigid material, and more preferably comprises a rigid phenolic foam.

According to a second aspect of the present invention there is also provided a derivative insulated ductwork product formed from an intermediate insulating product according to the first aspect of the present invention by mechanical manipulation of the intermediate insulating product thereof to bend it in regions adjacent the bottom of the channels, thereby causing the channels to close to form the non-planar, derivative insulated ductwork product.

Typically, a complete polygon cross-section is formed from an intermediate insulating product with cumulative internal angles of the channels such that it was possible to bend the intermediate insulating product so as to form a complete polygonal cross-section.

Preferably, the derivative insulated ductwork product is secured along a joining edge by a strip of adhesive tape applied along the joining edges of what was the intermediate insulation product.

According to a third aspect of the present invention there is also provided a section of ductwork product formed from an intermediate insulating product according to the first aspect of the present invention by mechanical manipulation of the intermediate insulating product thereof to bend it in regions adjacent the bottom of the channels, thereby causing the channels to close to form the non-planar, derivative insulated ductwork product.

According to a fourth aspect of the present invention there is also provided a connecting means for connecting a first section of ductwork in accordance with the third aspect of the present invention to a second section of ductwork in accordance with the third aspect of the present invention, the connecting means comprising:
  a first fitting member having an open end for accepting an end of the first section of ductwork;
  wherein the other end of the first fitting member is connected to a side of a flange member which projects outwardly from the first fitting member; and
  a second fitting member having an open end for accepting an end of the second section of ductwork; wherein the other end of the second fitting member is connected to a side of a flange member which projects outwardly from the second fitting member;
  and an internal throughbore which provides a sealed passageway for fluid to travel from a throughbore of the first ductwork, through said internal throughbore and into a throughbore of the second ductwork.

According to a fifth aspect of the present invention there is also provided a ductwork system comprising two or more sections of ductwork in accordance with the third aspect of the present invention and one or more connecting devices, the connecting devices comprising:
  a first fitting member having an open end for accepting an end of the first section of ductwork;
  wherein the other end of the first fitting member is connected to a side of a first flange member which projects outwardly from the first fitting member; and
  a second fitting member having an open end for accepting an end of the second section of ductwork; wherein the other end of the second fitting member is connected to a side of a second flange member which projects outwardly from the second fitting member;
  and an internal throughbore which provides a sealed passageway for fluid to travel from a throughbore of the first ductwork, through said internal throughbore and into a throughbore of the second ductwork.

Preferably, the first and second fitting members comprise respective first and second annular rings.

Typically, the first and second annular rings each comprise a substantially constant inner diameter and a substantially constant outer diameter.

Preferably, the said flange member(s) project radially outwardly from the respective first and second fitting members.

The outer diameter of the respective first and second fitting member preferably contacts the inner diameter of the respective ductwork and the said one face of the flange member is arranged into butting contact with the end of the respective ductwork.

The first and second fitting members preferably further comprise a securing means which acts between the fitting members and the respective ductwork to prevent separation of the ductwork from the fitting member in a direction away from the flange member.

The securing means preferably comprise one or more barb member(s) which point in a direction toward the respective flange member.

The first and second fitting members may each comprise the same outer diameter. Alternatively, the first and second fitting members may each comprise different outer diameters.

Preferably, the flange member projects outwardly from the first and second fitting member by a distance substantially equal to the sidewall thickness of the ducting.

BRIEF DESCRIPTION OF THE DRAWINGS

FIGS. 1A to 1F are sections illustrating the formation of a derivate insulated product from an intermediate insulation product, in accordance with the first, second and third aspects of the present invention;

FIG. 6A is a side view of a connector in accordance with the fourth aspect of the present invention for connecting one ductwork having a larger internal diameter to another ductwork having a smaller internal diameter;

FIG. 6B is a cross sectional view through the lower half of the connector at FIG. 6A;

DETAILED DESCRIPTION OF THE INVENTION

Figure 1A:
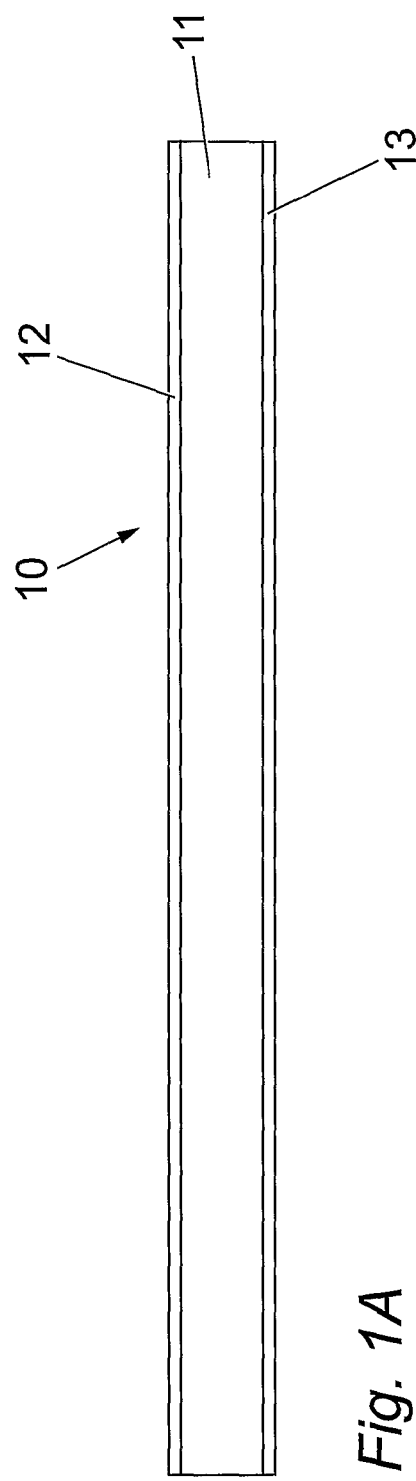

FIG. 1A is a section through a planar slab of insulating product 10. The product 10 has a "sandwich" construction with a core 11 of rigid phenolic insulating foam having a topside protective layer 12 and a bottomside protective layer 13, both layers 12 and 13 being in the form of an aluminum foil or fibre glass scrim layer 12, 13. Such a product 10 may be commercially sourced, for example, such foam slabs are, at the time of writing, available from Kingspan Insulation Limited of Herefordshire in the UK in standard sizes of 1200 mm×2950 mm and 1000 mm×2950 mm and are typically either 22 mm or 33 mm thick. Alternative core insulating material 11 could also be used such as a polyisocyanurate or a polyurethane.

Figure 1B:
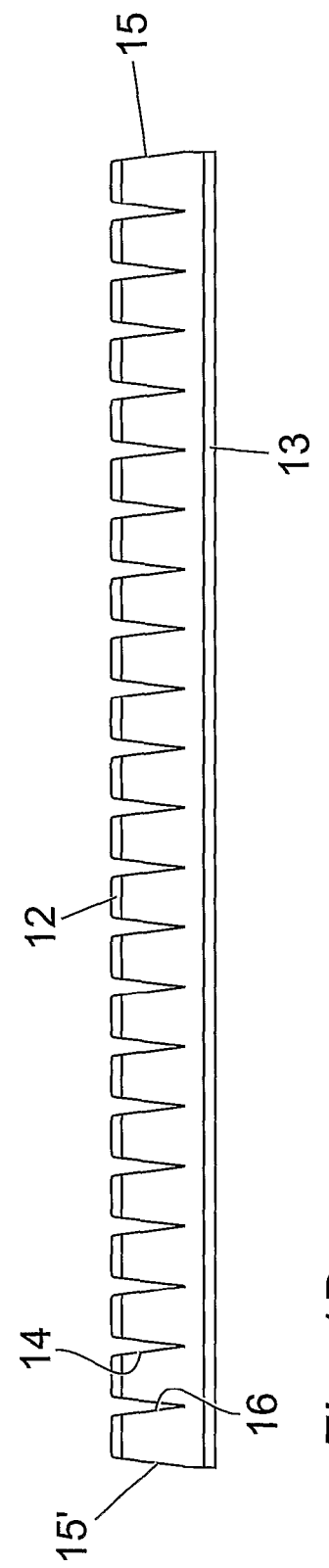

Referring to FIG. 1B, the planer slab 10 is formed into an intermediate insulation product 20 according to the first aspect of the present invention by firstly providing the slab 10 with a series of parallel, "V" shaped channels 14 formed therein and with the edges of slab chamfered 15, 15' at the same angle as the sides of the channels 14.

Such channels 14 and chamfers 15, 15' may be formed in the slab 10 by a CNC router with a V shaped router bit. Where this is the case, the protective layer of material 12 may offer some protection to the core 11 against chipping or flaking during the routing, especially where the core 11 is made of a brittle insulator.

The cumulative sums of the internal angles of the all channels and the angle subtended between both chamfers 15, 15, is approximately 360°.

FIG. 1B shows the intermediate insulation product 20 with optional adhesive sealant 16 deposited in the bases of the channels 14.

The next step in forming an intermediate insulating product in accordance with the first aspect of the present invention is to apply a vapour barrier 18, having a securing means in the form of self adhesive 18A provided on its underside, to the upper and interrupted surface of the product 10 such that the adhesive 18A secures the vapour barrier 18 to the upper surface 12 of the core 11 such that the vapour barrier 18 spans across all of the channels 14. The vapour barrier 18 is preferably a laminated foil vapour barrier 18 and the adhesive 18A is preferably a pressure sensitive adhesive, which is pre-applied to the underside of the laminated foil barrier 18. Such a self-adhesive vapour barrier 18 can be commercially sourced. For example, the preferred vapour barrier 18 is a five ply laminated aluminum foil vapour barrier available from Venture Tape® of Northants, UK sold under the trade name VentureClad 1577CW®. Alternative vapour barriers could also be used such as polythene and a suitable example of such a polythene is Duponts' chlorosulfonated polyethylene products marketed as Hypalon®.

Optionally, where the ductwork 30 is to be used in external applications (e.g. on the outside of buildings, factories, oil rigs etc.), a further outer layer (not shown) is preferably attached to the bottomside on the outer surface of the aluminum foil surface 13. Preferably, such a further outer layer is also vapour proof to enable the ductwork 30 to be weather proof. The vapour outer layer is preferably again a laminated foil vapour barrier provided with a pre-applied pressure sensitive adhesive and such a self-adhesive vapour barrier can be commercially sourced and is more preferably a five ply laminated aluminum foil vapour barrier available from Venture Tape® of Northants, UK sold under the trade name VentureClad 1577CW®.

This results in the formation of the intermediate insulating product 20.

Figure 1C:
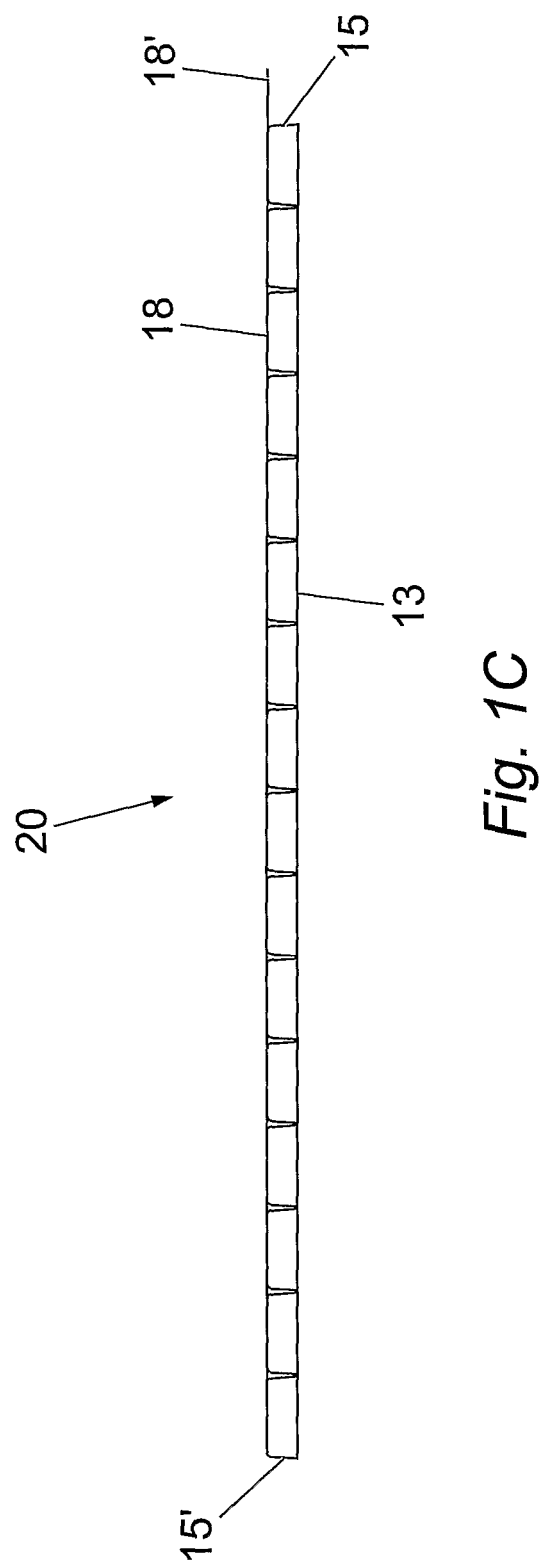
Figure 1E:
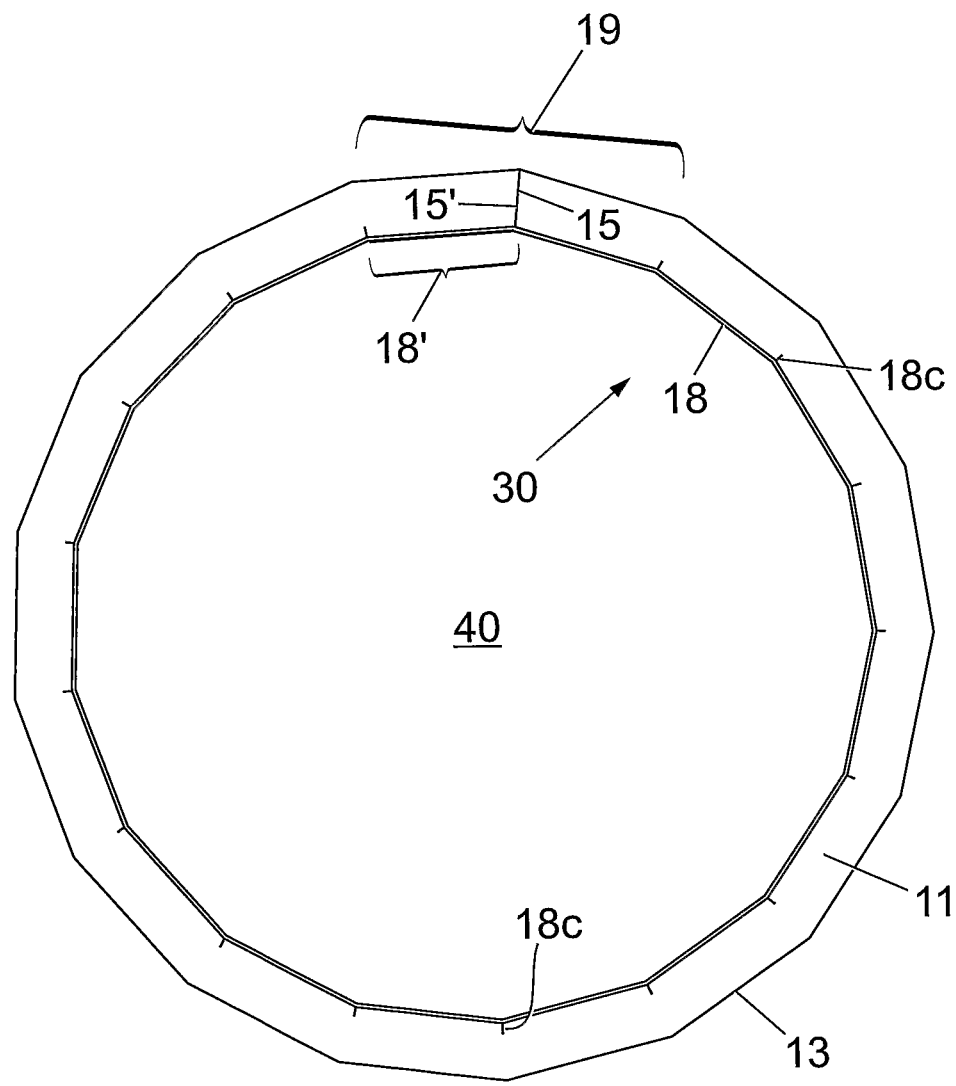
Figure 1F:
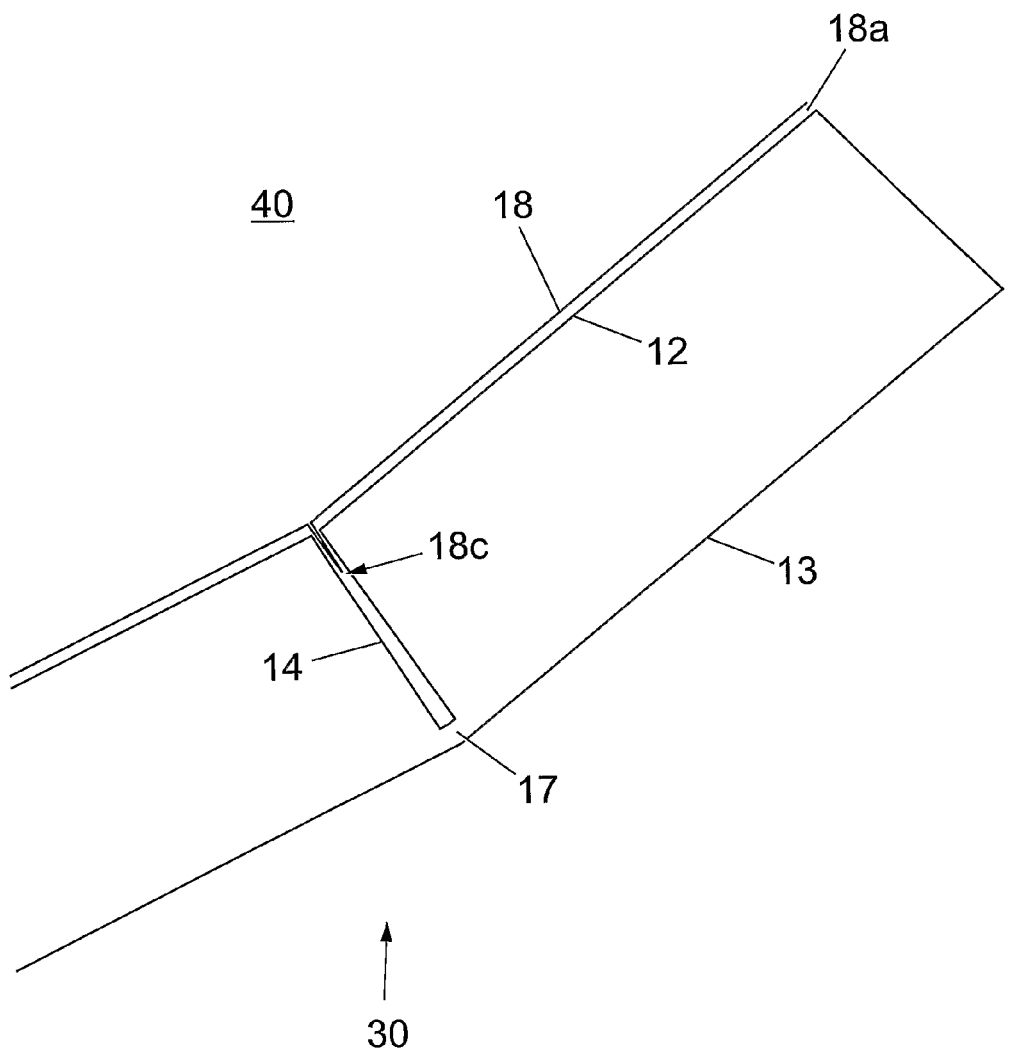

Thereafter and as illustrated in FIGS. 1D, 1E and 1F, the intermediate insulation product 20 (with optional adhesive sealant 16) may be rolled up with appropriate mechanical manipulation or by hand whereupon the continuous areas 17 of core 11 deform, enabling the channels 14 to close and a polygonal shaped insulated product 30 to be formed as shown in FIG. 1E. Thus, a derivative insulated product 30 is then formed which can be used as a ductwork 30 to carry fluid such as air in for example an air conditioning system for a building.

The adhesive sealant 16 if present ensures a tight and permanent seal between the edges of the channels 14. Surplus adhesive sealant if present, egresses from the closed channels 14 and solidifies at the internal edge of the join between the channels 14.

Moreover, and as can be best seen in FIG. 1F, when the intermediate insulating product 20 with vapour barrier 18 attached is rolled up, the section of the inner lining 18C which bridges the channels 14 will naturally be moved into the channels 14 and thereby form a seal over the channels 14. The width of the vapour barrier 18 typically equals the width of the intermediate insulating product 20 although as can be seen in FIG. 1C the length of the vapour barrier 18 is greater than the length of the intermediate insulating product 20 such that a flap member 18' is provided at one end of the intermediate insulating product 20. Furthermore, when the intermediate insulating product 20 has been fully rolled up to form the ductwork 30, the entire inner throughbore 40 of the ductwork 30 can be sealed with respect to the outside of the ductwork 30 by pressing the inner lining flap 18' (as seen in FIG. 1C as being provided at one end of the vapour barrier 18) with a suitable smooth edged hand tool or machine tool to seal the flap 18' against the other end of the vapour barrier 18. Accordingly, the flap 18' (which is integral with the rest of the vapour barrier 18) provides an overlap with the other end of the vapour barrier 18 when the intermediate insulating product has been bent to form the ductwork 30 such that the vapour barrier 18 extends greater than 360 degrees around the inner throughbore.

Consequently, the ductwork 30 can be used to carry liquids and/or provides a sealed throughbore 40 such that the risk of any air born bugs/diseases finding shelter to grow is substantially reduced.

Alternatively, and/or additionally, the vapour barrier 18 can be provided with a self cleaning and/or anti-bacterial surface coating and such a surface coating is commercially available from Cytack UK Limited and/or the vapour barrier 18 can be formed of a vinyl base with such an anti-bacterial and/or self cleaning layer applied.

Alternatively and preferably, the vapour barrier 18 may be pressed into the channels 14 (when it is applied to the upper surface of the planer product 10 to form the intermediate product 20) by a suitable tool such as a "V" shaped smooth edged hand tool (not shown) such that in the region of 5 mm of vapour barrier 18 is stuck to each channel 14.

The longitudinal edges of the intermediate insulation product 20 which have been pushed together are held in place by an adhesive strip 19 of laminated foil vapour barrier. Ideally, this strip 19 is the same material as the laminated foil vapour barrier 13 already applied to the underside of the core slab 10 as illustrated in FIG. 1A and now on the periphery of the formed polygon shaped derivative insulated product or ductwork 30 as illustrated in FIG. 1E.

Optionally and additionally bands such as bands of tape or aluminum or plastic bands could be provided around the outer circumference of the derivative insulating product/ductwork 30 to provide additional strength in order to keep the edges (of the intermediate insulation product 20) together and thereby the polygon shape of the ductwork 30.

Figure 2A:
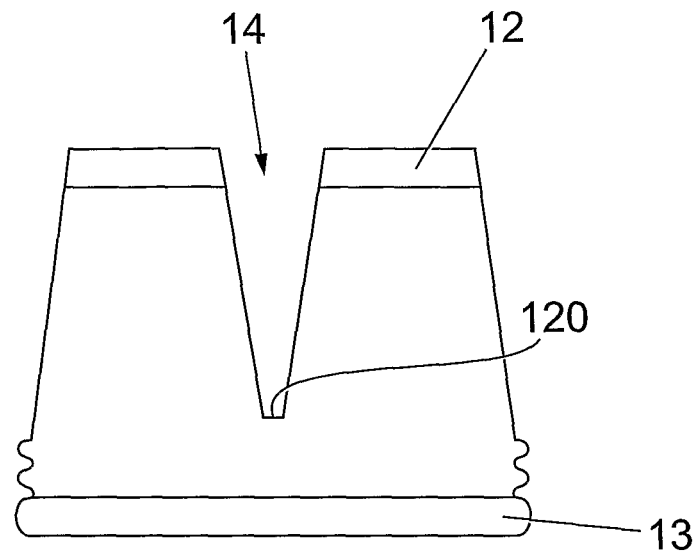
FIGS. 2A and 2B are sections illustrating alternative channel cross-sections of an intermediate insulation product in accordance with the first, second and third aspects of the present invention.
Figure 2B:
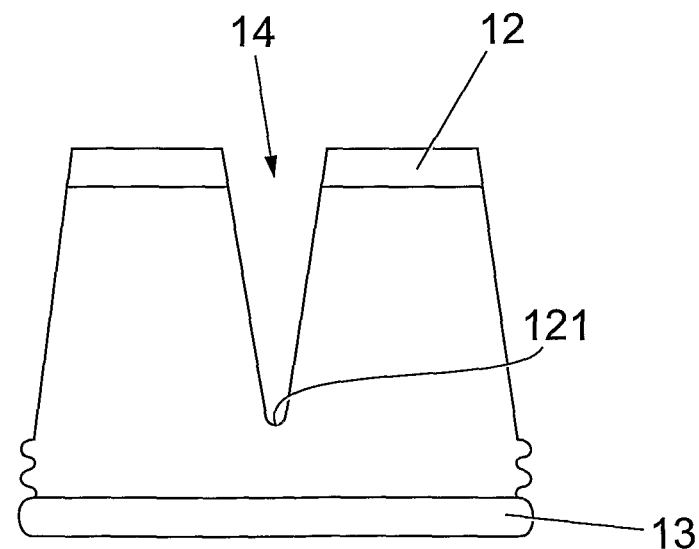

The channels are shown in FIGS. 1A to 1C as perfect V shaped channels. However, embodiments of the present invention are much more preferably provided with the alternative channel cross-sections illustrated in FIGS. 2A and 2B. In FIG. 2A, the base of a channel 14 is shown with a small, flat section 120 and in FIG. 2B, it is curved 121. Also, the depth of the channels 14 could be varied depending on the strength of the insulating product core 11 and/or the thickness of the material and/or the elasticity of the bottomside protective layer 13 should it need to expand to accommodate deformation for the insulating product core 11. Conceivably, the base of the channel 14 could extend to the bottomside protective layer 13 where there would then be no deformation of the insulating core 11 as such, just flexing of the supporting bottomside protective layer 13.

In the above example, it is stated that the cumulative sums of the internal angles of the channels 14 and the angle subtended between both chamfers 15, 15' is approximately 360°. However, because the adhesive sealant 18 may partially fill the channel 14 such that the edges of the channel do not fully meet, a complete and structurally sound polygon 30 can be created when the cumulative sum of angles of the channels 14 and the angle subtended between both chamfers 15, 15' exceeds 360°

Conversely, the edges of the channels 14, may deform when pushed together, enabling a complete polygon 30 to be created when the cumulative sum of angles of the channels 14 and the angle subtended between both chamfers 15, 15' is less than 360°.

In the above example, the taper of the channels 14 is uniform. This need not be the case and indeed appropriate selection of tapers could be used, for example, to provide a polygon shaped derivative insulated ducting product 30 with a degree of eccentricity (e.g. approximating an ellipse). For example, the resulting insulating product/ductwork 30 need not be circular but could be, for example, an oval shape having flattened sides to provide a flat oval ductwork (not shown) by leaving the upper and lower flat sections of the ductwork 30 without channels 14.

Also in the above example, the insulating core 11 is shown with two initial protective layers 12, 13. However, the principle of the present invention applies equally to insulator cores 11 with a single protective layer 13 or indeed no protective layer.

Furthermore, whilst the shape of the derivative insulated product 30 described is polygonal, the more channels 14 use to form a polygon, the more it will approximate a circle, especially if the deformation of the core 11 at the base 17 of the channel 14 smoothes the periphery of the polygon.

Typically, the ductwork 30 would be supplied to its site of installation (e.g. a building site) from a factory pre-rolled and as shown in FIG. 1E such that it is ready to be installed on site. In order to aid installation on site and also to ensure that individual ductwork 30 sections can be joined together in a sealed manner, a number of connectors in accordance with the fourth aspect of the present invention are also provided and are shown in FIGS. 3-8.

Figure 3A:
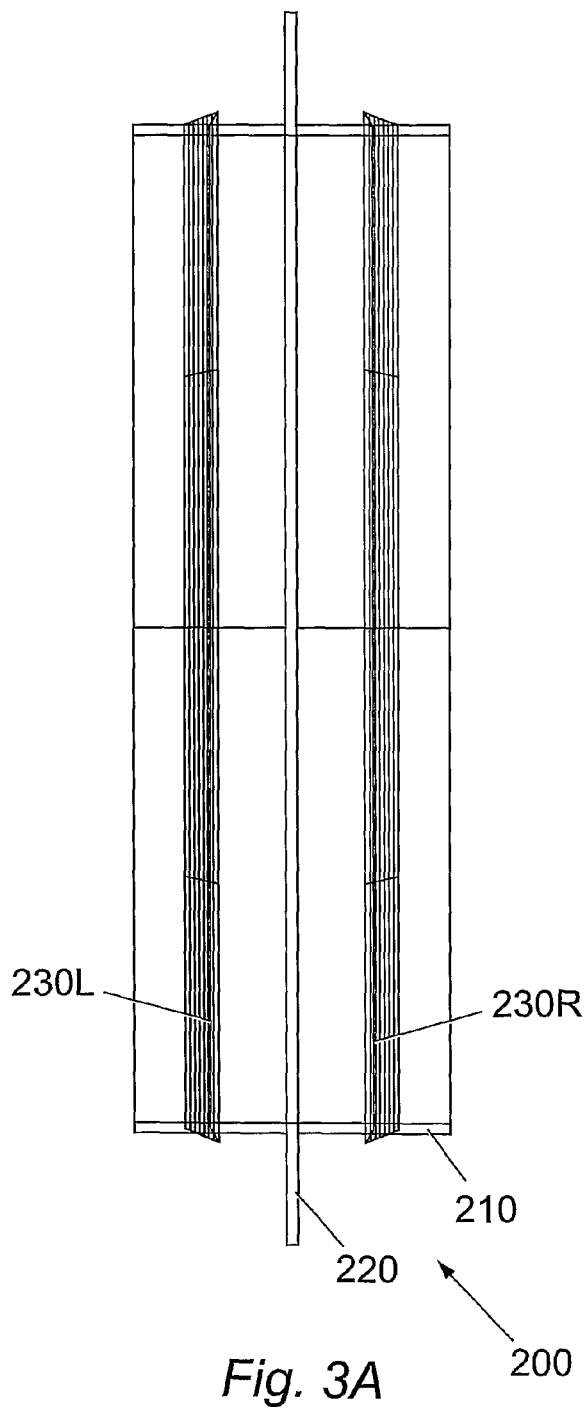
FIG. 3A is a side view of a connector in accordance with a fourth aspect of the present invention for connecting two derivative insulated ductwork products in accordance with the first, second and third aspects of the present invention where both ductworks have the same internal diameter.
Figure 3B:
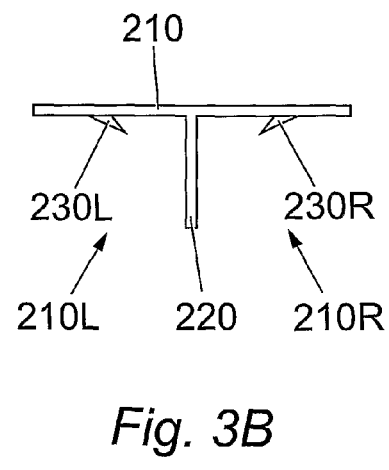
FIG. 3B is a cross sectional side view through one half of the connector of FIG. 3A.
Figure 3C:
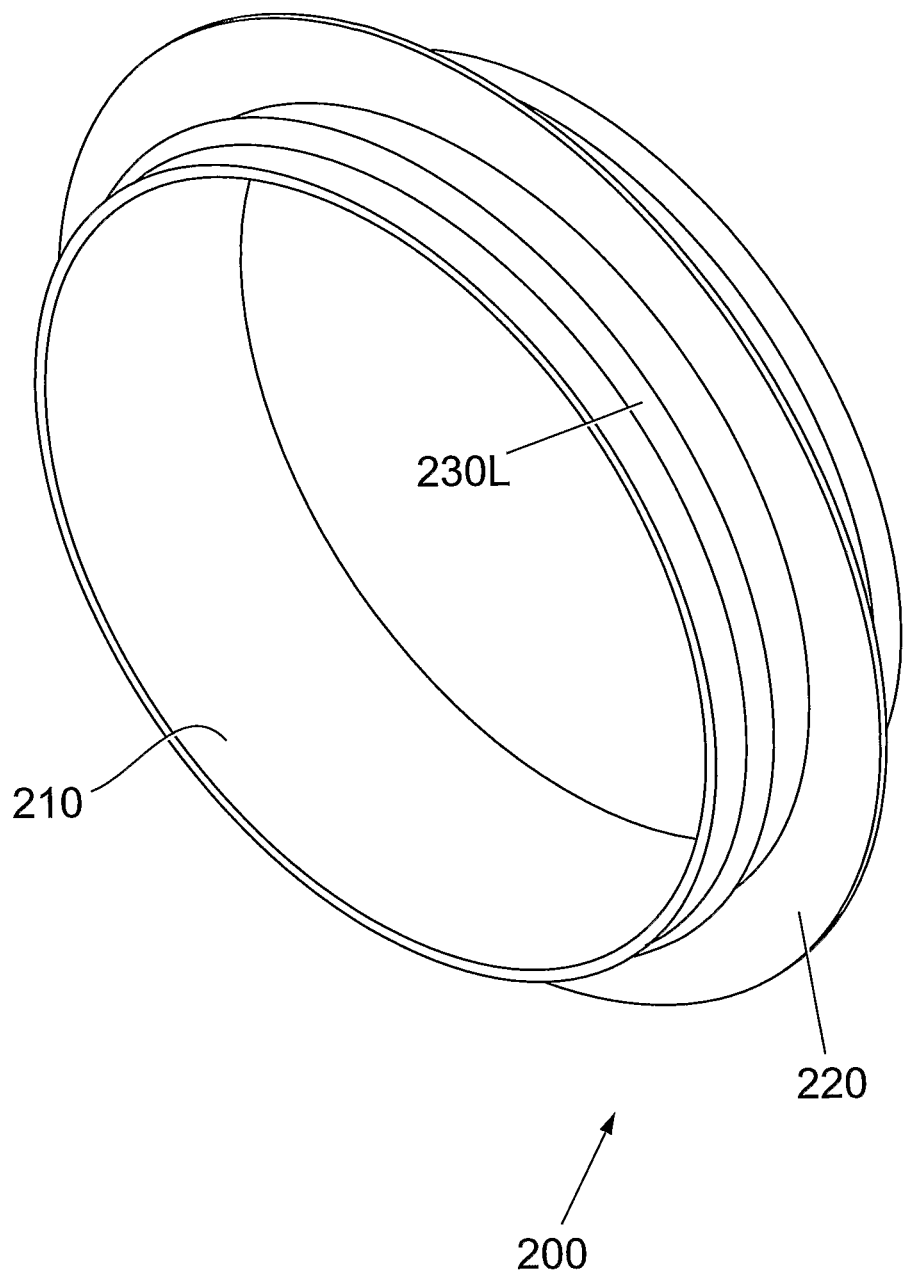
FIG. 3C is a perspective view of the connector at FIG. 3A.

The first embodiment of a connector 200 is shown in FIGS. 3A, 3B and 3C. The connector 200 comprises an annular ring 210 having a constant inner diameter and being provided with an outwardly extending flange shoulder 220 which projects radially outwardly from the mid point of the annular ring 210. An outwardly and rearwardly projecting gripping means in the form of a pointed rib or barb 230L, 230R is also provided on each side of the flange ring 220 where the barb 230L, 230R has a sharpened outer point which is pointed in the direction of the flange ring 220. The connector 200 is preferably formed of a rigid plastic material such as a Class O (fire resistant) plastic material but it could be formed from other suitable materials and this could be a metal such as galvanised sheet, aluminum sheet, stainless steel, aluminised steel etc., depending upon the end use of the ductwork 30.

In use, a left hand section of ductwork 30 is pushed on to the left hand part 210L of the annular ring 210 where the outer diameter of the annular ring 210 is chosen such that it is a close fit with the inner diameter of the ductwork 30. The ductwork 30 is pushed on to the connector 200 until the end of the ductwork 30 butts against the left hand face of the flange should 220 and the barb 230L projects into and thereby grips the inner diameter of the ductwork 30. The angle of the barb 230L is such that it prevents the ductwork 30 from backing off the connector 200. An end of an other ductwork 30 is pushed on to the other end 210R of the connector 200 and the radius of the flange 220 is chosen such that it has the same diameter as the outer surface of both sections of ductwork 30 such that a flushed outer joint is provided between the two ends of the ductworks 30 and the flange 220. A suitable adhesive, such as a mastic, can be applied between the connector 200 and the inner circumference of the ductwork 30 if desired, in order to increase the connection between the two. The two ductworks 30 can then be sealed together by applying tape around the outer circumference of the joint such that the tape seals over the joint created between the flange 220 and the two ends of the ductwork 30.

The ductwork 30 can be cut on site to suit the length required.

Figure 4A:
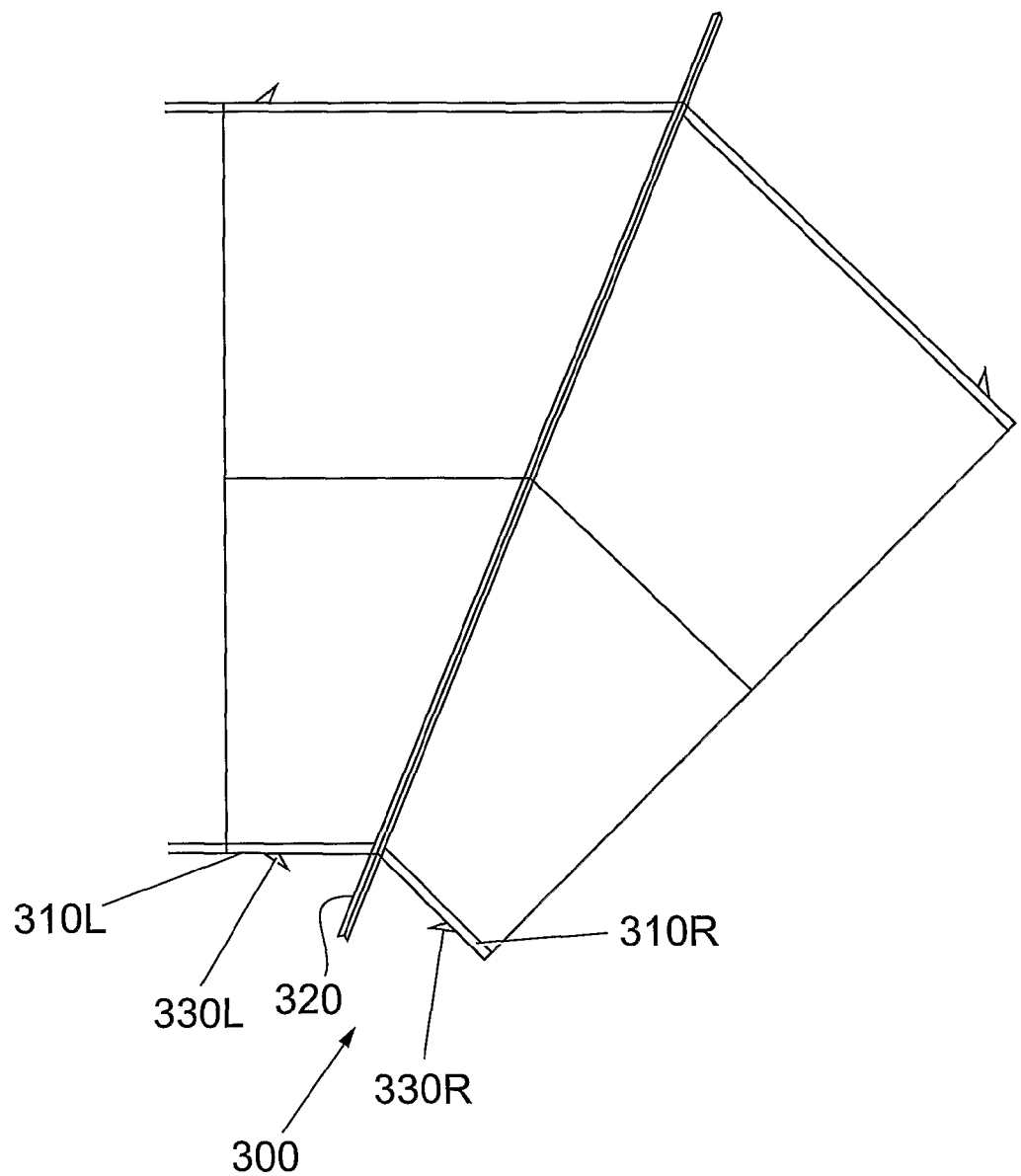
FIG. 4A is a side view of another embodiment of a connector in accordance with the fourth aspect of the present invention for connecting two ductworks having the same internal diameter together but at a 45° angle to one another in order to create a 45° bend.

Various other connectors are shown in the drawings. FIG. 4A shows a connector broadly similar to the connector 200 but formed with a 45° bend between the left hand 310L and right hand 310R sides of the annular ring 310. Bards 330L and 330R are also provided and point towards the flange ring 320 and serve the same purpose as the barbs 230L, 230R and flange ring 220 as described for the connector 200. Moreover, two connectors 300 can be used with a short length of ducting 30 there between to form a 90° bend in a long length of duct tape 30.

Figure 4B:
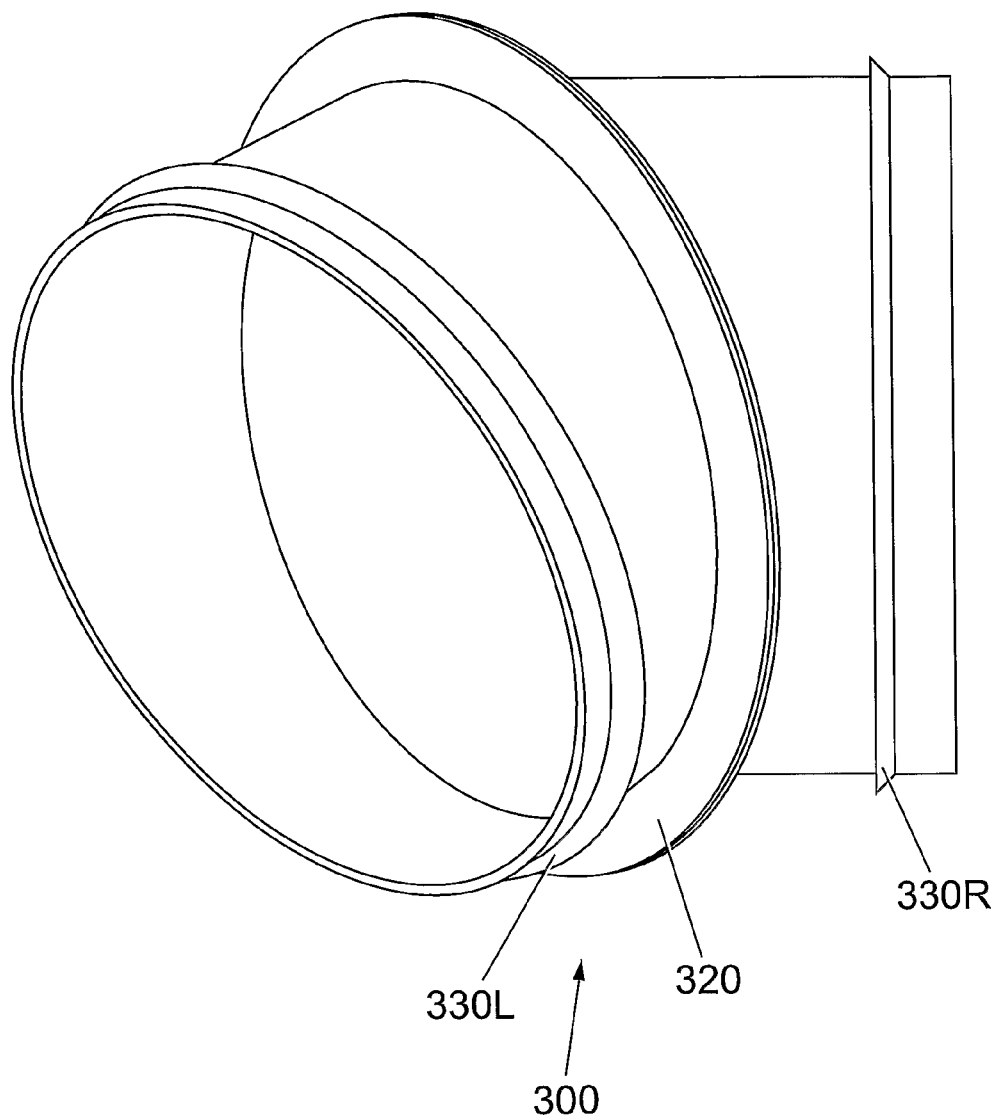
FIG. 4B is a perspective view of the connector at FIG. 4A.
Figure 5A:
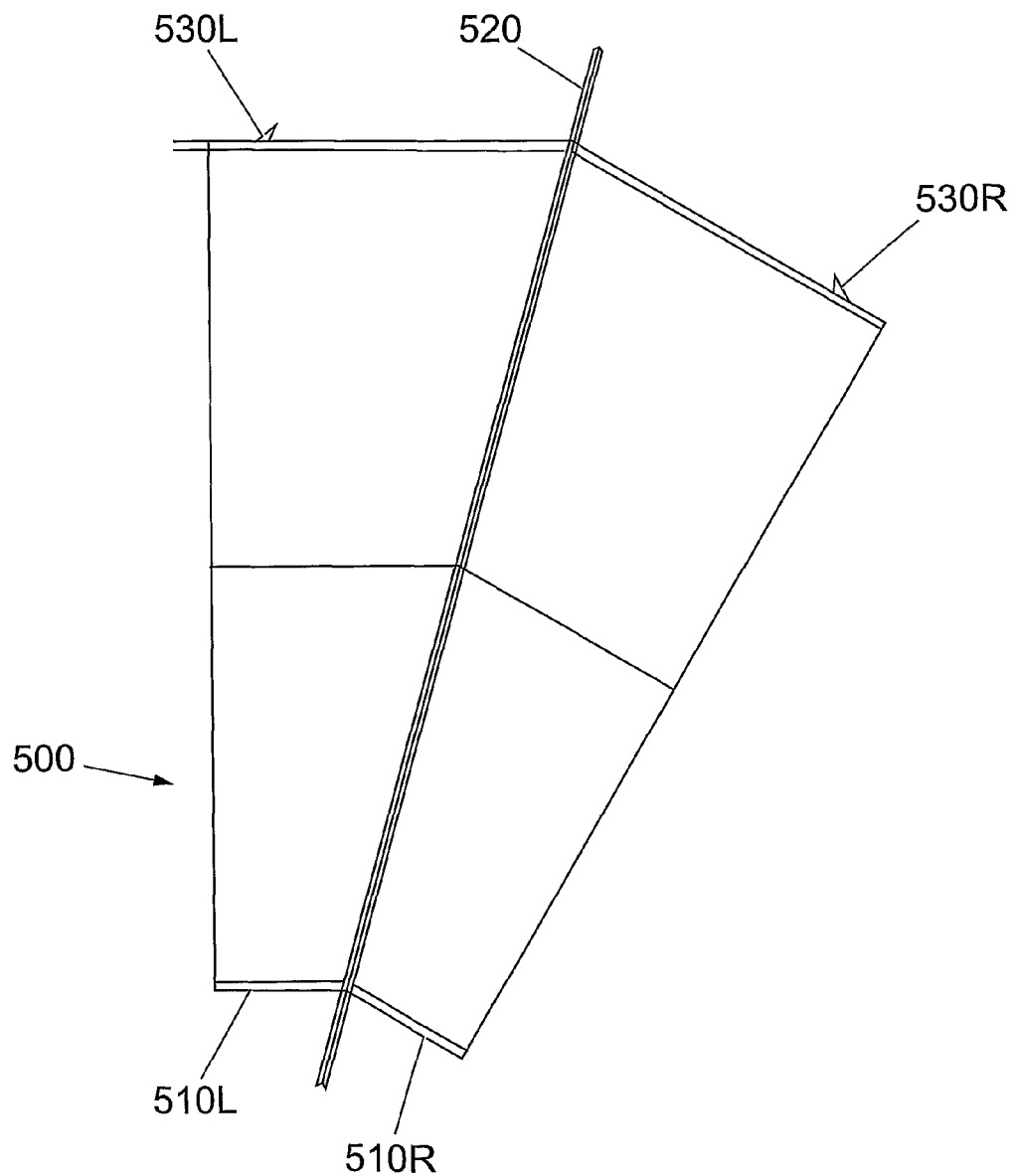
FIG. 5A is a side view of another embodiment of a connector in accordance with the fourth aspect of the present invention for connecting two ductworks having the same internal diameter together but at a 30° angle to one another in order to create a 30° bend.
Figure 5B:
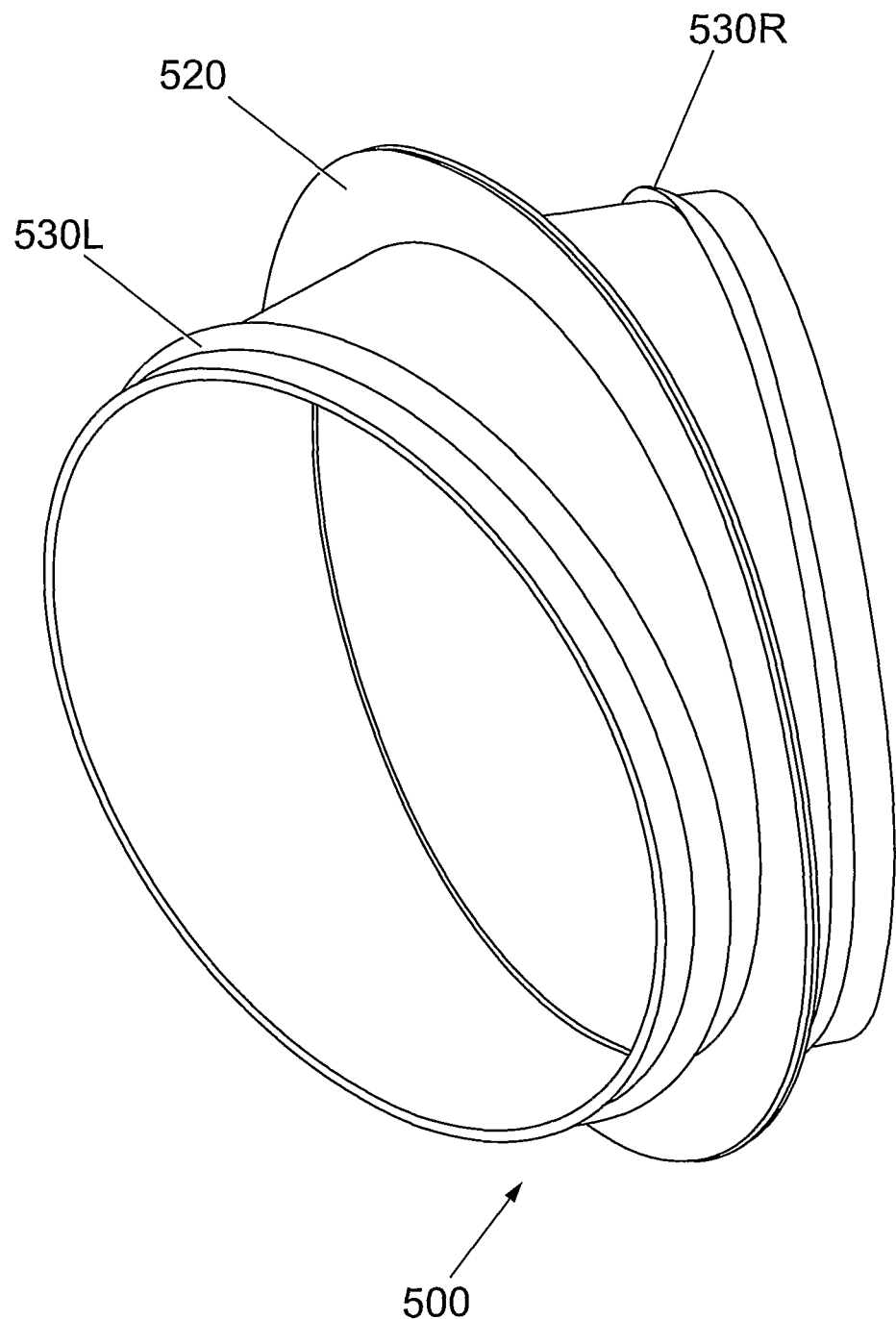
FIG. 5B is a perspective view of the connector at FIG. 5A.

FIG. 5A shows another embodiment of connector which is broadly similar to the connector 300 of FIGS. 4 A and B where like components in the connector 500 have been indicated with a numeral prefix 5 instead of numeral pre-fix 3. The main difference between the connector 300 and 500 is that the connector 500 has a 30° angle between the two sides 510L and 510R and thus three connectors 500 could be used together with short lengths of ductwork 30 between them in order to make a 90° bend in a long length of a plurality of ductwork sections 30 connected in series.

FIGS. 6A and 6B show a broadly similar connector 600 to the connector 200 of FIG. 3A to 3C where like components have been marked with the reference numeral prefix 6 instead of the reference numeral prefix 2.

However, there is a difference in the connector 600 in that the right hand side annual ring 610 R is smaller in diameter than the left hand side annular 610R in order that the connector 600 can be used to connect two ductworks 30 having different diameters together.

Figure 6D:
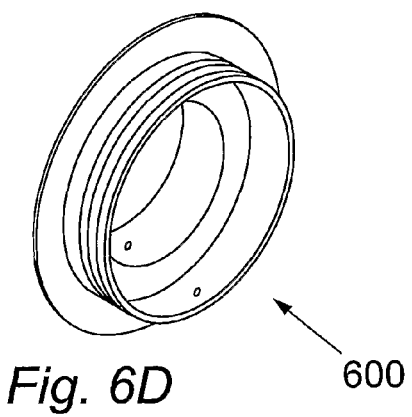
FIG. 6D is a first perspective side view of the connector shown in FIG. 6C.
Figure 6E:
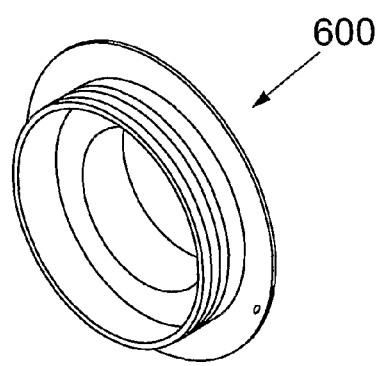
FIG. 6E is another perspective side view of the connector shown in FIG. 6C.
Figure 6C:
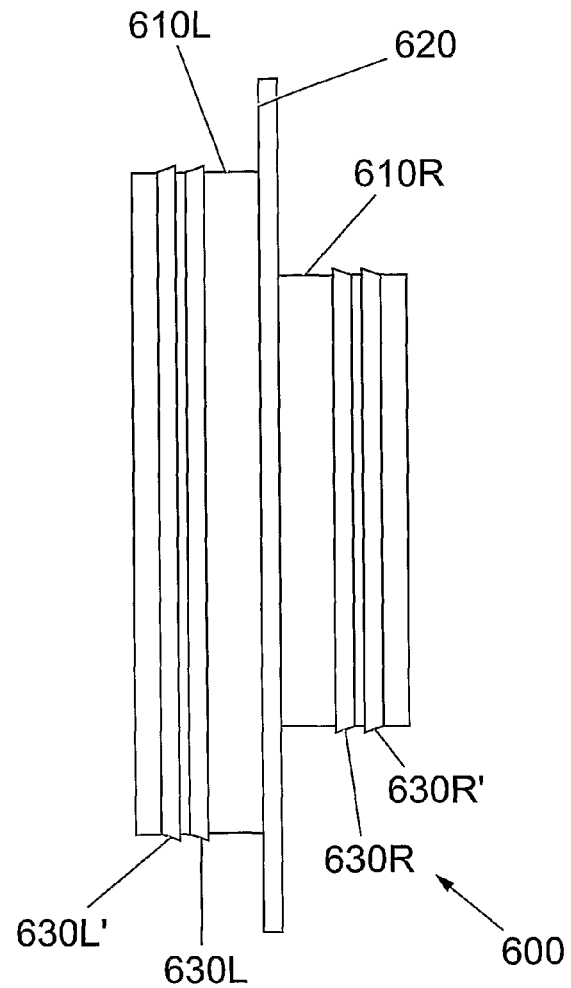
FIG. 6C is a side view of a slightly different embodiment of the connector shown in FIG. 6A.

FIGS. 6C, 6D and 6E show a very similar connector 600 to that of FIGS. 6A and 6B where the only difference between them is that the connector 600 in FIGS. 6C and 6E has two barbs 630L and 630L' on the left hand annular ring 610L and also has two barbs 630R, 630R' on the right hand annular ring 610R in order to increase the gripping force between the connector 600 and the ductworks 30.

Figure 8A:
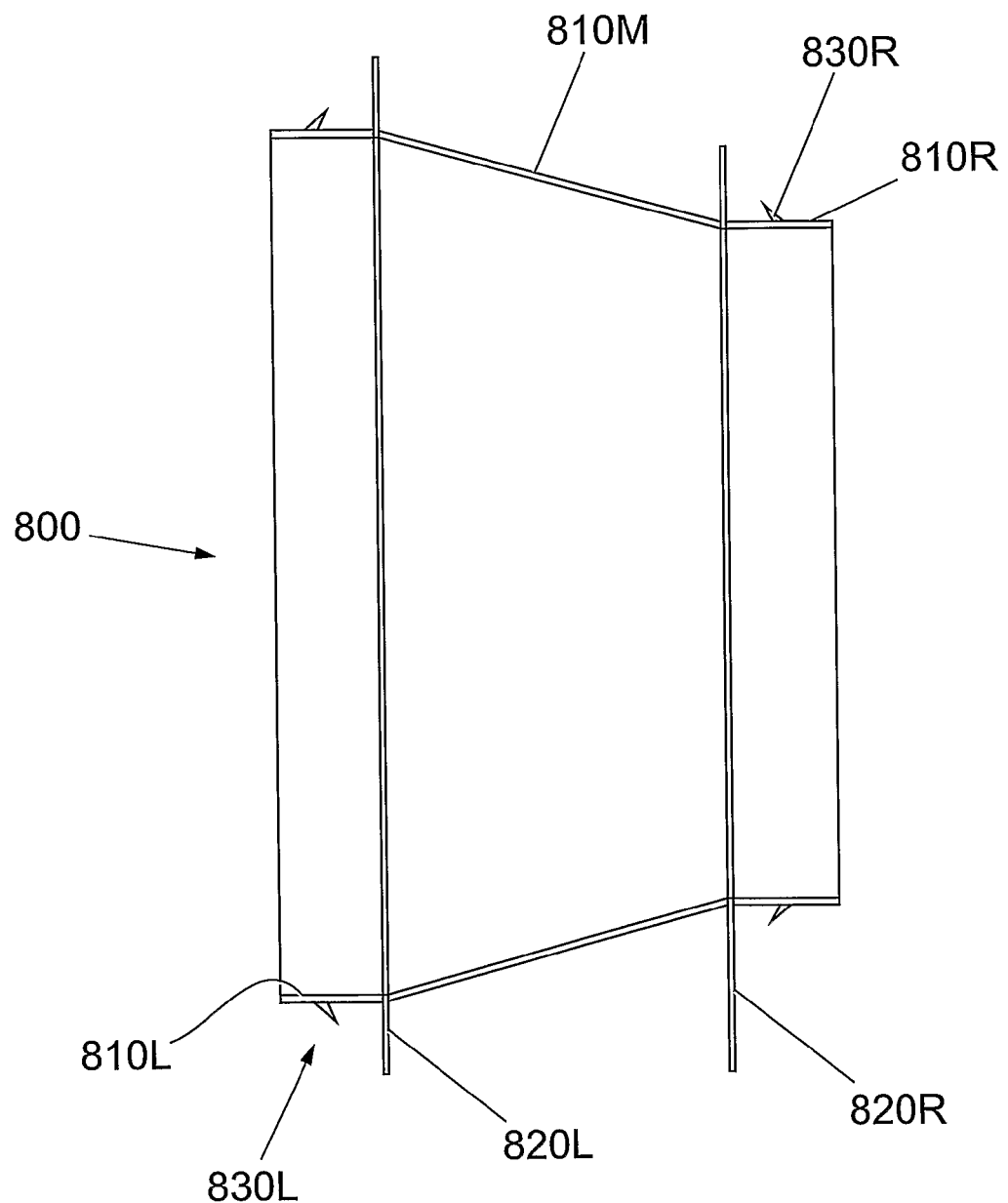
FIG. 8A is another embodiment of a connector in accordance with a fourth aspect of the present invention for connecting a relatively large circular ductwork to a relatively small diameter circular ductwork.
Figure 8B:
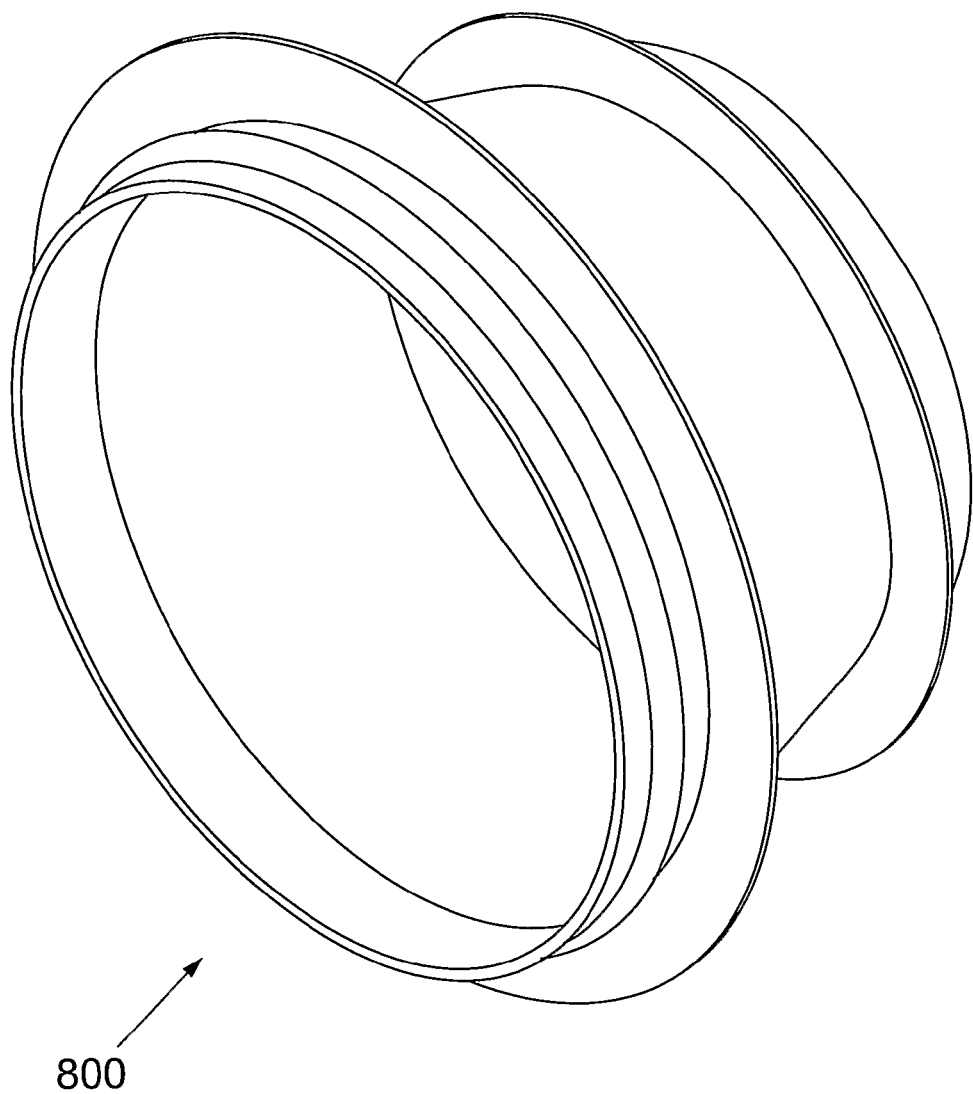
FIG. 8B is a perspective view of the connector shown in FIG. 8A.

The connector 800 shown in FIG. 8A is broadly similar to the connector 700 and like components have the prefix 8 instead of the prefix 7. However, the connector 800 has a circular cross section at each end 810L and 810R but which are again separated by a tapered transitional diameter section 810M.

Figure 7A:
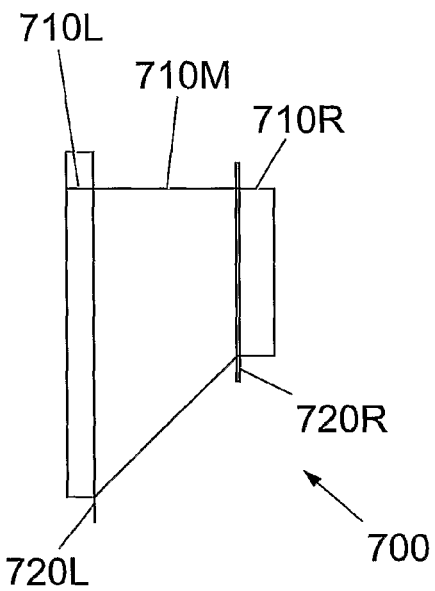
FIG. 7A is a side view of a connector in accordance with the fourth aspect of the present invention to break into a square section of ductwork to provide a branch of another section of ductwork.
Figure 7B:
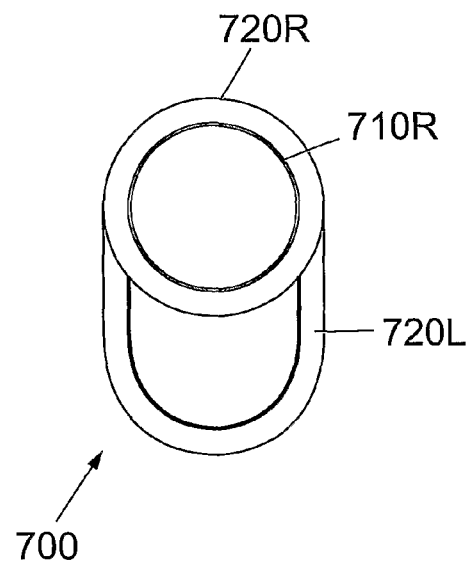
FIG. 7B is an end view of the connector shown in FIG. 7A.
Figure 9:
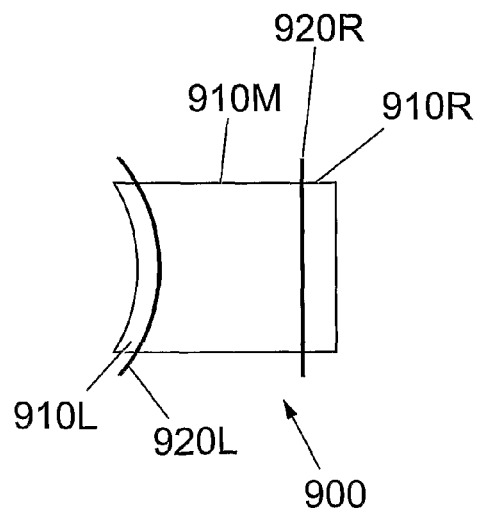
FIG. 9 is a side view of a connector in accordance with the fourth aspect of the present invention to break into a circular section of ductwork to provide a branch of another section of ductwork.

The connector 900 in FIG. 9 is somewhat different from the other connectors in that the left hand side 910L comprises a concave end face and is intended to be inserted into an aperture cut into the side wall of a length of circular ductwork 30 such that the end 910L provides the ability to cut into longitudinal lengths of circular ductwork 30. FIGS. 7A and 7B show another form of connector 700 which is broadly similar to the connector 900 shown in FIG. 9 where like components have the prefix 7 instead of the prefix 9. However, the connector 700 has a left hand annular ring 710L which has a flat end face and is oval in cross section, and the right hand side of the flange ring 720L is connected to a tapered transitional diameter section 710M which reduces in diameter from the left hand to the right hand side until it joins the left hand side of the flange ring 720R. The flat end face of the left hand annular ring 710L is arranged to be inserted into a like-shaped aperture cut into the planar sidewall of a rectangular section of ductwork 30.

In all cases, tape is wound around the joints created by the connectors such that the connectors are sealed with respect to the ductwork lengths 30, and a preferred tape will match the external coating of the ductwork 30. For example, if the ductwork 30 is supplied with the additional vapour proof outer layer, the tape 18 can comprise the same material as the additional layer (since it is preferably self adhesive). However, if the ductwork 30 is supplied without the additional vapour proof outer layer, the tape 18 can comprise any other suitable tape such as reinforced Aluminum foil tape available from Kingspan Insulation Limited of Herefordshire in the UK under product number 1524.

Modifications and improvements to the embodiments of the present inventions described herein may be made by those persons skilled in the relevant art without departing from the scope of the invention.

The invention claimed is:

1. An intermediate insulating ductwork product comprising a planar insulating layer having a protective layer on an innermost surface thereof and a plurality of parallel channels comprising cross-sections with tapered sides formed in, the innermost surface such that the protective layer is cut when the channels are formed; a vapor proof layer comprising an adhesive that secures the vapor proof layer to the protective layer applied to the innermost surface and the channels such that the vapor proof layer bridges the plurality of parallel channels; and wherein, with subsequent mechanical manipulation, the intermediate insulating ductwork product can be bent in regions adjacent bottom portions of the channels, thereby causing the channels to substantially close to form a non-planar, derivative insulated duct without metal ductwork having an inner throughbore and the vapor proof layer forms an innermost vapor proof lining to the inner throughbore of the derivative insulated duct and a surface of the intermediate insulated ductwork product opposite the innermost surface forms an outermost surface of the derivative insulated duct that is in contact with an external environment;

wherein the vapor proof layer comprises a sealing means to substantially seal the inner throughbore with respect to an outer circumference of the derivative insulated duct.

2. The intermediate insulating product as claimed in claim 1, wherein a continuous protective layer is provided on a resulting outermost surface of the insulating layer.

3. The intermediate insulating product as claimed in claim 1, wherein a protective layer is provided on the resulting innermost surface of the planar insulating layer prior to forming the channels, said protective layer adapted to reduce flaking or chipping of the planar insulating layer.

4. The intermediate insulating product as claimed in claim 3, wherein the channels are formed by routing.

5. The intermediate insulating product according to claim 1, wherein the channels are at least partially filled with one of or both a sealant and an adhesive.

6. The intermediate insulating product according to claim 1, wherein the cumulative internal angles of the channels are such that it is possible to bend the intermediate insulating product to form the derivative insulated product with a complete polygon cross-section.

7. The intermediate insulating product according to claim 1, wherein the planar insulating layer comprises a substantially rigid material.

8. The intermediate insulating product according to claim 7, wherein the substantially rigid material comprises rigid phenolic foam.

9. The intermediate insulating product according to claim 1, wherein the sealing means comprises a flap member provided at one end of the vapor proof layer and which is arranged to overlap the other end of the vapor proof layer when the intermediate insulating product has been bent to form the non-planar, derivative insulated ductwork product such that the vapor proof layer extends greater than 360 degrees around the inner throughbore.

10. The intermediate insulating product according to claim 9, wherein the flap member is integral with and forms an extension of the rest of the vapor proof layer.

11. The intermediate insulating product according to claim 1, wherein the vapor proof layer is substantially the same width as the resulting innermost surface of the planar insulating layer to which it is applied, and has a longer length than the resulting innermost surface of the planar insulating layer such that the flap member projects past one end of the planar insulating layer.

12. The intermediate insulating product according to claim 1, wherein the vapor proof layer comprises a laminated vapor proof barrier.

13. The intermediate insulating product according to claim 12, wherein the vapor proof barrier comprises a laminated foil vapor proof barrier formed from a number of layered sheets.

14. The intermediate insulating product according to claim 1, wherein the securing component comprises a self adhesive.

15. The intermediate insulating product according to claim 14, wherein the self-adhesive comprises a pressure sensitive adhesive pre-applied to the resulting outermost surface of the vapor proof layer.

16. The intermediate insulating ductwork product according to claim 1, wherein a further vapor proof layer is applied to a resulting outermost surface of the planar insulating layer such that the further vapor proof layer forms an outer vapor proof protective barrier to the derivative insulated duct.

17. The intermediate insulating product according to claim 16, wherein a further securing component is provided between the further vapor proof layer and the outermost surface.

18. The intermediate insulating product according to claim 17, wherein the further securing component comprises an adhesive component initially provided on the inner most surface of the further vapor proof layer.

19. A derivative insulated ductwork product formed from an intermediate insulating product according to claim 1.

20. The derivative insulated ductwork product as claimed in claim 19, with a complete polygon cross-section having been formed from an intermediate insulating product with cumulative internal angles of the channels such that it was possible to bend the intermediate insulating product to form a complete polygonal cross-section.

21. The derivative insulated ductwork product as claimed in claim 19, secured along a joining edge by a strip of adhesive tape applied along the joining edges of what was the intermediate insulation product.

22. The derivative insulated ductwork product according to claim 19, wherein the derivative insulated ductwork product comprises a section of ductwork.

23. A ductwork system comprising two or more sections of ductwork in accordance with claim 22 and one or more connecting devices, the connecting devices comprising:
a first fitting member having an open end for accepting an end of the first section of ductwork;
wherein the other end of the first fitting member is connected to a side of a first flange member which projects outwardly from the first fitting member; and
a second fitting member having an open end for accepting an end of the second section of ductwork; wherein
the other end of the second fitting member is connected to a side of a second flange member which projects outwardly from the second fitting member;
and an internal throughbore which provides a sealed passageway for fluid to travel from a throughbore of the first ductwork, through said internal throughbore and into a throughbore of the second ductwork.

24. The ductwork system according to claim 23, wherein first and second fitting members of the connecting devices comprise respective first and second annular rings.

25. The ductwork system according to claim 24, wherein the first and second annular rings of the connecting devices each comprise a substantially constant inner diameter and a substantially constant outer diameter.

26. The ductwork system according to claim 23, wherein the said flange member(s) of the connecting devices project radially outwardly from the respective first and second fitting members.

27. The ductwork system according to claim 23, wherein the outer diameter of the respective first and second fitting member contacts the inner diameter of the respective ductwork section and said respective side of the flange member is arranged into abutting contact with the end of the respective ductwork section.

28. The ductwork system according to claim 23, wherein the first and second fitting members further comprise a securing component which acts between the fitting members and the respective ductwork section to prevent separation of the ductwork section from the fitting member in a direction away from the flange member.

29. The ductwork system according to claim 28, wherein the securing component comprises one or more barb member(s) which point in a direction toward the respective flange member.

30. The ductwork system according to claim 23, wherein the first and second fitting members each comprise the same outer diameter.

31. The ductwork system according to claim 23, wherein the first and second flange members project outwardly from the first and second fitting members by a distance substantially equal to the sidewall thickness of the ductwork section.

32. The ductwork system according to claim 23, wherein the first and second flange members comprise opposite faces of the same flange.

33. A section of ductwork comprising the derivative insulated product of claim 19.

* * * * *